US 9,076,258 B2

(12) United States Patent
Kass et al.

(10) Patent No.: US 9,076,258 B2
(45) Date of Patent: Jul. 7, 2015

(54) STYLIZING ANIMATION BY EXAMPLE

(71) Applicant: PIXAR, Emeryville, CA (US)

(72) Inventors: Michael Kass, Emeryville, CA (US);
Pierre Benard, Emeryville, CA (US);
Forrester Cole, Emeryville, CA (US)

(73) Assignee: PIXAR, Emeryville, CA (US)

( * ) Notice: Subject to any disclaimer, the term of this patent is extended or adjusted under 35 U.S.C. 154(b) by 188 days.

(21) Appl. No.: 13/829,602

(22) Filed: Mar. 14, 2013

(65) Prior Publication Data
US 2014/0267350 A1    Sep. 18, 2014

(51) Int. Cl.
*G06T 13/00* (2011.01)
*G06T 15/00* (2011.01)
*H04N 1/60* (2006.01)
*G06T 15/02* (2011.01)
*G09G 5/393* (2006.01)
*G09G 5/02* (2006.01)
*G06T 13/80* (2011.01)
*H04N 19/61* (2014.01)
*G06T 11/60* (2006.01)
*H04N 7/14* (2006.01)

(52) U.S. Cl.
CPC . *G06T 15/02* (2013.01); *H04N 7/50* (2013.01);
*G06T 15/005* (2013.01); *G06T 11/60* (2013.01);
*H04N 7/142* (2013.01); *G09G 5/393* (2013.01);
*G09G 5/02* (2013.01); *G06T 13/80* (2013.01)

(58) Field of Classification Search
USPC ......... 345/418, 428, 473, 501, 545, 581, 589,
345/475, 606, 618, 619, 629, 691;
348/14.15, 407.1, 412.1, 413.1, 431,
348/456; 382/168, 181, 232, 235–236, 276,
382/305
See application file for complete search history.

(56) References Cited

U.S. PATENT DOCUMENTS

| | | | |
|---|---|---|---|
| 8,704,828 B1 * | 4/2014 | Witkin et al. | 345/420 |
| 8,766,985 B1 * | 7/2014 | Kass et al. | 345/473 |
| 2006/0055700 A1 * | 3/2006 | Niles et al. | 345/473 |
| 2007/0146360 A1 * | 6/2007 | Clatworthy et al. | 345/419 |
| 2013/0113807 A1 * | 5/2013 | Niles et al. | 345/473 |

* cited by examiner

*Primary Examiner* — Wesner Sajous
(74) *Attorney, Agent, or Firm* — Patterson & Sheridan LLP

(57) ABSTRACT

The disclosure provides an approach for stylizing animations to synthesize example textures. In one embodiment, a synthesis application down-samples input and style buffers. To obtain a sequence of offset fields, each of which takes pixels in the output stylized frame to corresponding pixels in the stylized example image, the synthesis application may optimize each frame of the animation at level l−1, then advect the results of a previous frame to a next frame using velocity fields. After having processed the entire animation sequence forward through time, a similar sweep may be performed backwards. Then, the resulting offset fields may be up-sampled to level 1 and used as the starting point for optimization at that finer level of detail. This process may be repeated until returning to the original sampling, which yields the final output.

25 Claims, 5 Drawing Sheets

STYLIZING ANIMATION BY EXAMPLE

BACKGROUND

1. Field

Embodiments presented herein relate to the field of computer animation and, in particular, to stylizing animations by example.

2. Description of the Related Art

Hand-painted imagery can achieve a warmth and range of styles that is difficult to replicate with three-dimensional (3D) computer rendering. However, many visual styles are currently unsuitable for use in animation because of the difficulty of maintaining temporal coherence, which has been described as a compromise between three goals: flatness (preservation of the 2D appearance of the simulated style), motion coherence (correlation with the apparent motion of the 3D scene), and temporal continuity (minimization of abrupt changes in time). For example, fine-scale texture detail is a common and often important feature of visual styles. In animations, such texture details may change from frame to frame, however, and it can be prohibitively time consuming for an artist to manually paint each frame to ensure that the texture details change smoothly from frame to frame without causing flicking, propping, or other artifacts.

Techniques have been introduced for generating painterly animations having specific styles, such as watercolor, pen-and-ink hatching, and sparse brush strokes. However, current techniques apply to a narrow range of visual styles, and give artists little direct control over the end result. As a result, artists cannot easily create animations having their own unique styles, or many other styles which they may prefer.

SUMMARY

One embodiment of the invention includes a computer implemented method for stylizing an animation. The method includes receiving a first set of buffers including an input animation and a second set of buffers including one or more example stylized images, and generating an offset field for a first frame of the input animation by iterative optimization based on a goal function. The method further includes, for each remaining frame of the input animation, advecting an offset field for a preceding frame to use as an initial offset field guess for a current frame, and iteratively optimizing the initial offset field guess based on the goal function to generate an offset field for the current frame. In addition, the method includes generating a stylized version of the input animation based on the offset fields.

Other embodiments include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
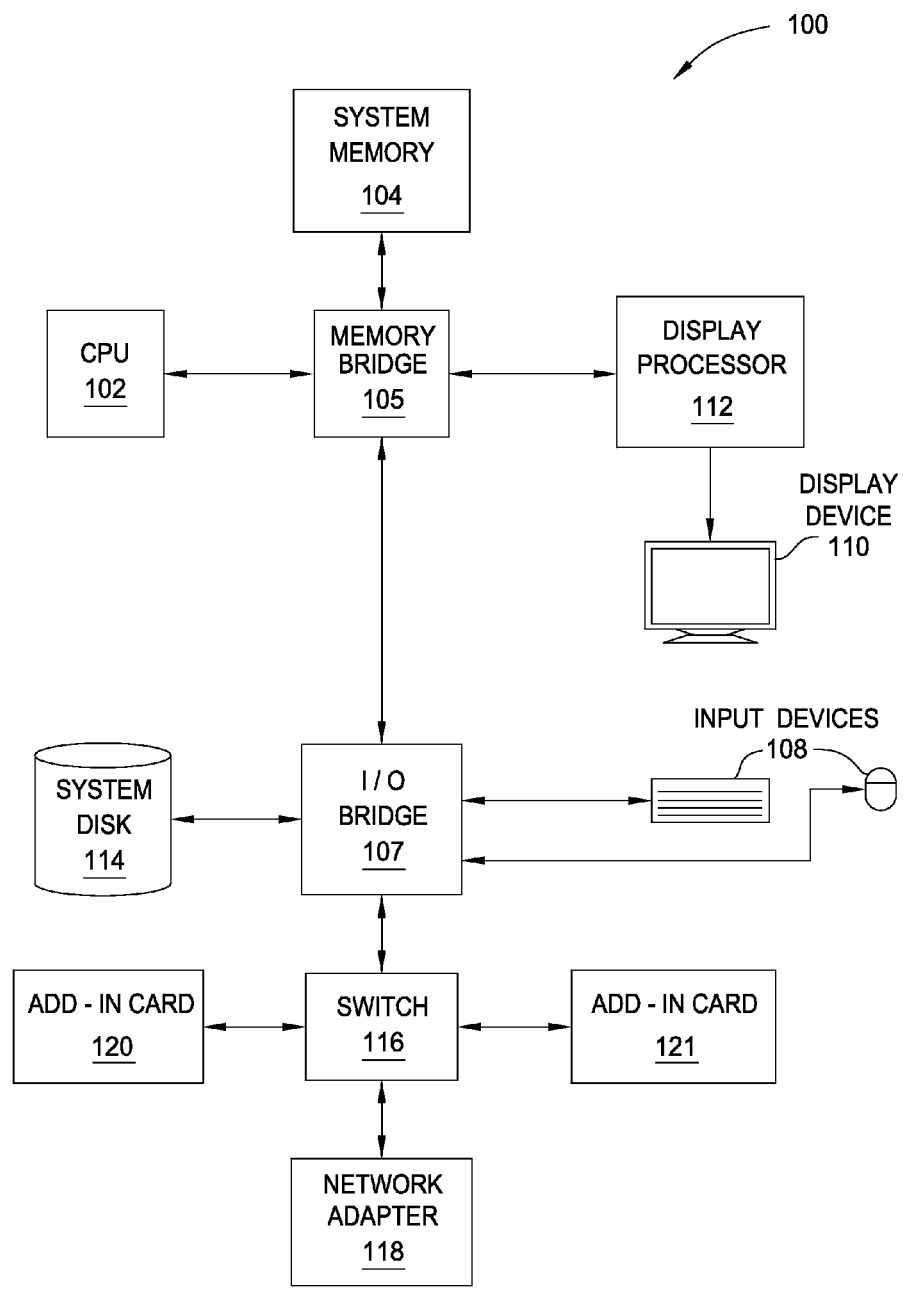
FIG. 1 is a block diagram of a system configured to implement one or more embodiments of the invention.

Embodiments disclosed herein provide techniques for stylizing animations to synthesize example textures. In one embodiment, a synthesis application down-samples input and style buffers. Here, the input buffers may include CG animations rendered based on 3D model(s) into deep buffers including, for each frame, input shading information, orientations, and input velocities. Similarly, the style buffers may include a static style having an input, an output, and an orientation. The input and output images in the style buffer define an analogy pair, and the transformation between the two is used as the basis for transforming the animation to a stylized animation. The synthesis application may initialize all frames in the animation sequence with random offset fields, which take each pixel in the output stylized frame to a corresponding pixel in a stylized example image.

The synthesis application may then synthesize a first frame of the sequence by selecting candidate pixels in the output style image, evaluating a goal function at each of the candidate pixels, and updating the offset field using a candidate pixel having the best (e.g., highest or lowest) goal function value, until convergence. Here, candidate pixels may be selected using, e.g., the technique of PatchMatch. PatchMatch is an algorithm for computing dense approximate nearest neighbor correspondences of image neighborhoods for arbitrary distance functions. PatchMatch relies on iteratively improving a set of correspondences until convergence by alternating between propagation and random search, as described in Barnes, C., Schechtman, E., Finkelstein, A., and Goldman, D. B. 2009. Patchmatch: A Randomized Correspondence Algorithm for Structural Image Editing. *ACM Transactions on Graphics* 28, 3 (August), hereby incorporated by reference in its entirety. In one embodiment, the goal function which is evaluated for each of the candidate pixels may be constructed as the weighted sum of a number of contributing goal functions, including an output term, an input term, a spatial coherence term, a temporal coherence term, a histogram term, and a distance transform term.

Then, the synthesis application may update frame t based on frame t−1 as follows. For each pixel p in frame t, the synthesis application may determine whether the pixel was visible in the previous frame. If the pixel was occluded, a random offset is used as an initial guess; if the pixel was visible, the synthesis application advects the offset of the previous frame to use as an initial guess. The synthesis application improves the initial guess by selecting candidate pixels in the output style image, evaluating the goal function at each of the candidate pixels, and updating the offset field using a candidate pixel having the best (e.g., highest or lowest) goal function value, until convergence.

After processing the entire sequence forward through time, a similar sweep may be performed backwards. In the backward sweep, the synthesis application may take into account the solution of the forward sweep by randomly merging the last offset field at frame t with the advected result from frame t+1. Further forward-backwards iterations may also be performed. Then, the resulting offset fields may be up-sampled and used as the starting point for optimization at a finer level of detail. This process may be repeated until returning to the original sampling, which yields the final output.

In one embodiment, the example stylized images may be keyframes from the animation sequence itself which have been, e.g., painted by an artist. In such a case, the offset field for any given frame may include pixel coordinates from the two keyframes between which the given frame lies. Further, the goal function may include, in lieu of a temporal coherence term, an input time-derivative term which enforces that the synthesized animation change in the same way the input animation changes and an output time-derivative term that allows the output to change consistently with spatial variations in style. During the forward and backward optimization sweeps, the synthesis application copies the contents of a keyframe whenever that frame is reached. Further yet, the synthesis application may modify the merging scheme to bias towards the closest keyframe to enforce smooth convergence. If PatchMatch optimization is used, the optimization may be improved by testing offset candidates that are not only spatial neighbors in the current style, but also neighbors following ribbons between successive pairs of keyframes determined by either recursively following velocity paths from one keyframe to another, or directly rendering long range velocities between keyframes. In addition, as a preprocessing step, the animation scene from which keyframes are taken may be decomposed into layers that can be painted separately. For each scene element, the synthesis application may extrapolate the image-space velocity fields using a distance transform of the input layer. Doing so permits an artist to apply paint beyond a boundary of an element in the input animation, and the overpainted regions to be rendered sensibly by the extrapolated velocity field. This may be particularly beneficial for CG animations which include perfect boundaries, in contrast to the non-perfect boundaries of many styles.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

System Overview

FIG. 1 is a block diagram of a system 100 configured to implement one or more embodiments. System 100 may be a computer workstation, personal computer, video game console, personal digital assistant, rendering engine, mobile phone, or any other device suitable for practicing one or more embodiments.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs (also referred to herein as "shaders"), tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments disclosed herein, animations are stylized by synthesizing example textures, such as those of keyframes, while maintaining temporal coherence. Certain embodiments may be implemented as one or more applications executed by display processor 112. Although discussed herein primarily with respect to such applications, other embodiments of may be implemented in software stored in system memory 104 and executed by CPU 102 and/or display processor 112. Still further embodiments may be implemented in fixed function hardware included within display processor 112. Other embodiments may be implemented as a combination of hardware and software.

Overview of Example Embodiments

Figure 2:
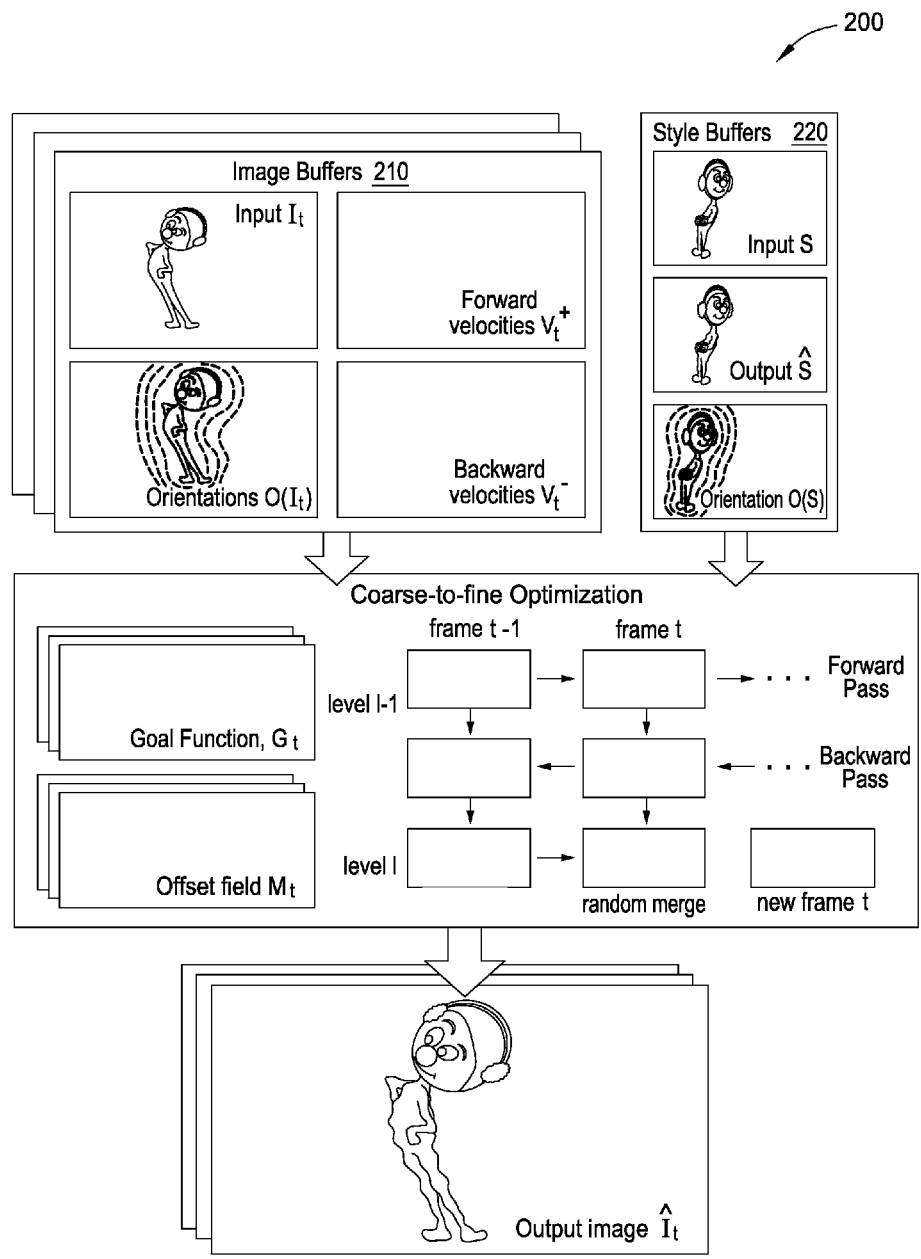
FIG. 2 illustrates an approach for stylizing animations, according to an embodiment of the invention.

FIG. 2 illustrates an approach for generating stylized animations, according to an embodiment of the invention. As shown, an input animation $I_t$ is transformed into a stylized animation $\hat{I}_t$ by applying an example-based style transformation defined by input S and corresponding stylized output $\hat{S}$. In one embodiment, the transformation may be achieved by optimizing for a sequence of mappings $M_t$ (also referred to herein as "offset fields"), where the mapping $M_t$ takes each pixel p in $\hat{I}_t$ to a corresponding pixel $M_t(p)$ in the output $\hat{S}$, thereby defining the output animation $I_t$ as $\hat{I}_t(p)=\hat{S}(M_t(p))$. A good mapping $M_t$ produces an output $\hat{I}_t$ that resembles the input $I_t$ in the same way as output $\hat{S}$ resemble input S.

As shown, the inputs received by a synthesis application (not shown) include image buffers 210 and style buffers 220. The image buffers 210 include computer graphics (CG) animations rendered based on 3D model(s) into deep buffers including, for each frame t, input shading information $I_t$, orientations $O(I_t)$, and input velocities $V_t^+$ and $V_t^-$. Here, the velocities $V_t^+$ and $V_t^-$ and orientations $O(I_t)$ define the motion of the animation. The velocities and orientations may be determined by any feasible means, including well-known techniques. Of course, the animations need not be CG, and may be instead regular 2D animations. In another embodiment, the image buffers 210 may include additional data. For example, the cheeks of the character in the image buffers 210 may be colored to reduce ambiguity of these special features, providing more precise control is space and time of the result. In other embodiments, the image buffers 210 need not be color buffers at all. For example, the image buffer 210 may include normals, texture coordinates, and the like that are temporally coherent.

To obtain the sequence of offset fields $M_t$, the synthesis application may first down-sample the image buffer 210 and style buffer 220. At resolution level l−1, the synthesis application may optimize each frame, then advect the results of a previous frame to a next frame using velocity fields $V_t^+$ and $V_t^-$. In one embodiment, the synthesis application may update frame t based on frame t−1 by determining whether each pixel was visible in the previous frame, and, if the pixel was visible, advecting the offset of the previous frame to use as an initial guess. Then, the synthesis application improves the initial guess by considering, for each pixel in frame t of the input animation $I_t$, multiple candidate pixels from the output $\hat{S}$ for inclusion in the offset field $M_t$. Candidate pixels may be chosen using any feasible means, such as that used in PatchMatch. Having chosen the candidate pixels, the synthesis application may evaluate a goal function $G_t$ at those candidate pixels. When new offets are found that improve the goal function, the offset field $M_t$ is updated to include the new offets. This process may repeat until convergence.

As shown, an optimization sweep may be performed forwards in time, and a similar optimization sweep may also be performed backwards. In the backwards sweep, the synthesis application may randomly merge the last offset field at frame t from the forward sweep with the advected result from frame t+1. If another forward sweep is performed, the synthesis application may randomly merge the offset field at frame t with the advected result from frame t−1. Further forward-backwards iterations may also be performed. As shown, the resulting offset fields for level l−1 may be up-sampled to a higher-resolution level l, another random merging of the offset field at frame t with the advected result from frame t−1 performed, and the result used as the starting point for optimization at level l.

In one embodiment, the example stylized images may be keyframes from the animation sequence itself which have been, e.g., painted by an artist. In such a case, the offset field for any given frame may include pixel coordinates from the two images keyframes between which the given frame lies. Further, the goal function may include, in lieu of a temporal coherence term, an input time-derivative term which enforces that the synthesized animation change in the same way the input animation changes and an output time-derivative term that allows the output to change consistently with spatial variations in style. During the forward and backward optimization sweeps, the synthesis application may copy the contents of a keyframe when the frame is reached. Further yet, the synthesis application may modify the merging scheme to bias towards the closest keyframe to enforce smooth convergence. If PatchMatch optimization is used, the optimization may be improved by testing offset candidates that are not only spatial neighbors in the current style, but also neighbors follows ribbons between successive pairs of keyframes determined by either recursively following velocity paths from one keyframe to another, or directly rendering long range velocities between keyframes. In addition, as a preprocessing step, the animation scene from which keyframes are taken may be decomposed into layers that can be painted separately. For each scene element, the synthesis application may extrapolate the image-space velocity fields using a distance transform of the input layer. Doing so permits an artist to apply paint beyond a boundary of an element in the input animation, and the overpainted regions to be rendered sensibly by the extrapolated velocity field. This may be particularly beneficial for CG animations which include perfect boundaries, in contrast to the non-perfect boundaries of many styles.

Note, to permit the style to be used at arbitrary orientations, the synthesis application uses orientation fields $O(S) \in [0,\pi]$, defined in the coordinate system of the style, and $O(I_t) \in [0,\pi]$, defined in the coordinate system of the input images, and performs rotations to compensate for different local orientations indicated by the orientation fields. The orientation fields $O(S)$ and $O(I_t)$ may be authored by a user (e.g. by rendering a vector field defined on a 3D surface), or computed automatically (e.g., as a by-pixel structure tensor of the grayscale image). Structure tensors in particular have the benefit of permitting meaningful interpolation and averaging during downsampling. Note, there may be some inherent ambiguity in the orientation of patterns that resemble lines or stripes, as a rotation by an angle of π may leave the dominant orientation unchanged, thereby making the compensating rotation ambiguous. To prevent a visible branch cut, the optimizing application may use the smallest angle of rotation $\phi(p_1, p_2)$ that brings the directions of $O(I_t)(p_1)$ and $O(S)(p_2)$ into alignment.

Figure 3:
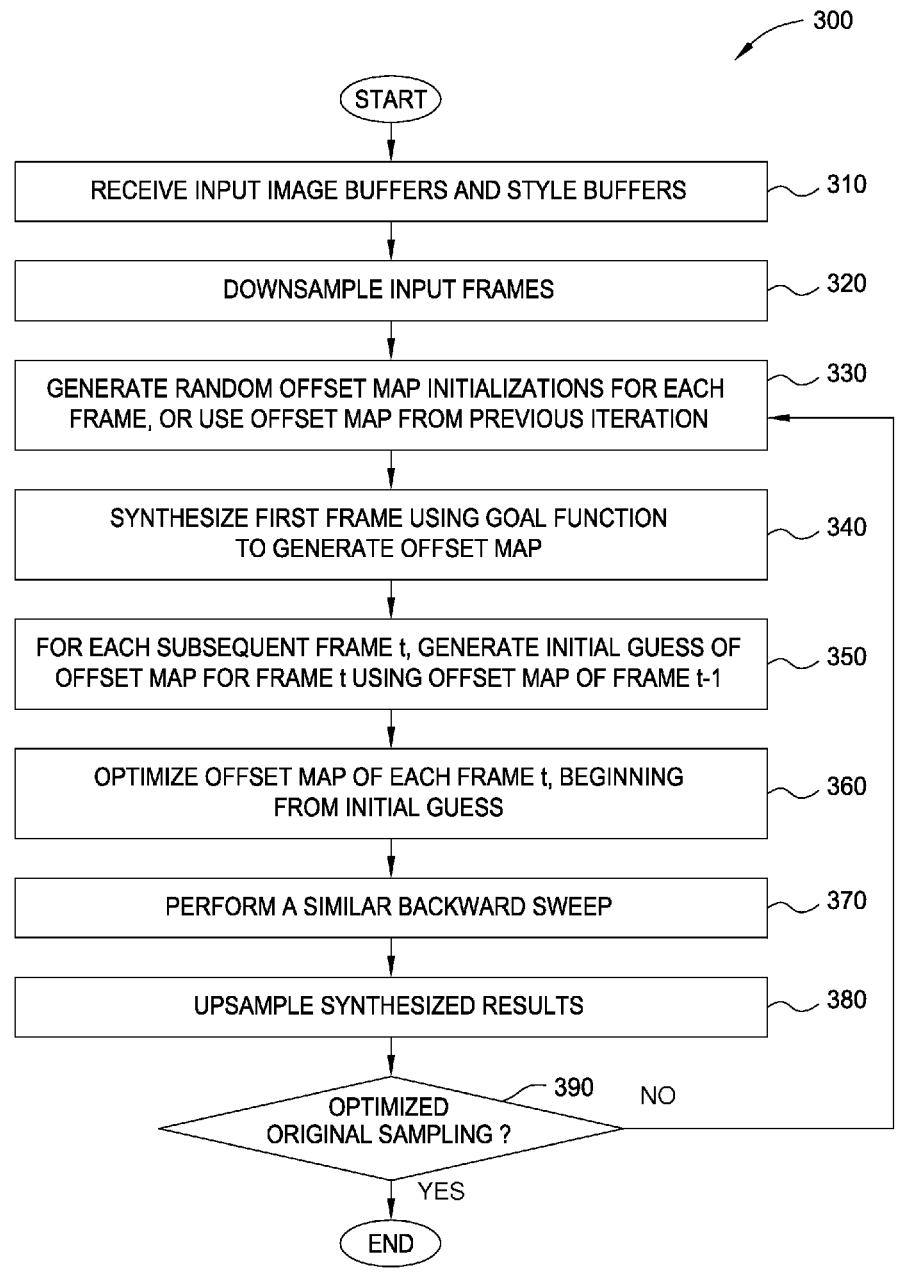
FIG. 3 illustrates a method for generating stylizations of animations given example images, according to an embodiment of the invention.

FIG. 3 illustrates a method 300 for generating stylizations of animations given example images, according to an embodiment. As shown, the method 300 begins at step 310, where a synthesis application receives input image buffers and style buffers. As discussed, the input image buffers may include CG animations rendered based on 3D model(s) into deep buffers including, for each frame t, input shading information, orientations, and input velocities. Similarly, the style buffers may include a static style having an input, an output, and an orientation. As discussed, the animations need not be CG, and may be instead regular 2D animations. In another embodiment, the image buffers may include additional data, such as indications of special features of an animation scene. In yet other embodiments, the image buffers need not be color buffers at all, and may instead include, e.g., normals, texture coordinates, and the like that are temporally coherent.

At step 320, the synthesis application down-samples the input frames. Downsampling the input frames reduces the resolution of those frames. In one embodiment, the input frames may be down-sampled by factors of two in both dimensions until a single pixel in the down-sampled output corresponds to the typical feature size in the output style textures.

At step 330, the synthesis application generates random offset field initializations for each frame. As discussed, an offset field indicates, for each pixel p in a corresponding frame $\hat{I}_t$, a pixel $M_t(p)$ in output style image $\hat{S}$ from which the pixel p is taken. For example, the offset field may comprise the (x,y) coordinates of pixels in output style image $\hat{S}$. Such an offset may initially include random (x,y) coordinates, which are then improved, as discussed in greater detail below. In one embodiment, the synthesis may be performed parallel in space (i.e., offsets for pixels are determined in parallel) and sequential in time.

At step 340, the synthesis application synthesizes a first frame using a goal function to generate an offset field for that first frame. That is, the initialized, offset field may be updated to an offset field which better captures the style of the output image. In particular, the synthesis application may select candidate pixels in output style image $\hat{S}$ using, e.g., the technique in PatchMatch, evaluate a goal function at each of the candidate pixels, and update the offset field using an offset for candidate pixel having the best (e.g., highest or lowest) goal function value. As discussed, orientation may be accounted for during this process. This process may then be repeated until converge.

The goal function may be a property of a local neighborhood and have the form:

$$G_t(p) = \Sigma_{\Delta p \in \Omega} \omega(\Delta p) g(p, \Delta p), \quad (1)$$

where $\Omega$ represents the set of vectors from pixel p to its neighbors (e.g., a 9×9 square neighborhood), and $\omega(\Delta p)$ are weights that give more importance to samples near the center of the neighborhood. For example, the weights $\omega(\Delta p)$ may have Gaussian fall-off $$\omega(\Delta p) = e^{-\frac{|\Delta p|^2}{2\sigma^2}}.$$

The goal function $g(p, \Delta p)$ may be constructed as the weighted sum of a number of contributing goal functions, each representing a distinct aim of the synthesis. For example, the contributing goal functions may include an output term, an input term, a spatial coherence term, a temporal coherence term, a histogram term, and a distance transform term:

$$g(p,\Delta p) = \omega_{out} g_{out}(p,\Delta p) + \omega_{in} g_{in}(p,\Delta p) + \omega_{sc} g_{sc}(p,\Delta p) + \omega_{tc} g_{tc}(p,\Delta p) + \omega_h g_h(p,\Delta p) + \omega_{dt} g_{dt}(p,\Delta p). \quad (2)$$

The output term may be used to make each local neighborhood of output frame $\hat{I}_t$ near p look like a corresponding neighborhood of the output style $\hat{S}$ near $M_t(p)$. In order to compare the neighborhoods of $\hat{I}_t$ and $\hat{S}$, the synthesis application may take into account the rotation $\phi(p, M_t(p))$ between the local coordinates of the input and style images, discussed above. Let Rot$_\phi$ denote the rotation of a vector by an angle $\phi$. Then the pixel in the style coordinate corresponding to $p+\Delta p$ in the input is given by:

$$C_t(p, \Delta p) = M_t(p) + Rot_\phi(\Delta p) \quad (3)$$

The output term may then be written as:

$$g_{out} = |\hat{I}_t(p+\Delta p) - \hat{S}(C_t(p,\Delta p))|^2 \quad (4)$$

Experience has shown that RGB and Lab may be used to determine $g_{out}$, as there is not a significant difference in performance between the two.

Similarly, the input term may be used to make each neighborhood of the input frame $I_t$ match a neighborhood of one of the input style frames S. The input term may be defined in one embodiment as:

$$g_{in} = |I_t(p+\Delta p) - S(C_t(p,\Delta p))|^2 \quad (5)$$

The spatial coherence term may ensure that the mapping $p \rightarrow M_t(p)$ is relatively spatially continuous. Such a spatial continuity term helps capture the style of the stylized frames $\hat{S}$ by more favorably weighting pixels copied from contiguous regions in those frames, as opposed to pixels copied from, e.g., random locations. In one embodiment, the spatial coherence term may be of the form:

$$g_{sc} = \min(|M_t(p+\Delta p) - C_t(p,\Delta p)|^2, r_{max}). \quad (6)$$

This term is the squared distance between the actual offset at $p+\Delta p$ and the offset one would expect from p if the offset field were a simple rotation of the style output. The error is bound by $r_{max}$, as the actual distance in the stylized frames between discontinuous offsets is unimportant, so long as the amount of discontinuity in the mapping is reflected in $g_{sc}$.

The temporal coherence term helps prevent unnecessary or sudden changes in time, i.e, to minimize color variations of the output images along motion paths which do not include occluded positions. In one embodiment, the temporal coherence term may include a forward-looking term $g_{tc}^+$ and a backward looking term $g_{tc}^-$:

$$g_{tc}^+ = \chi^+(p,t) |\hat{I}_t(p) - \hat{I}_{t+1}(p+V_t^+(p))|^2$$

$$g_{tc}^- = \chi^-(p,t) |\hat{I}_t(p) - \hat{I}_{t-1}(p-V_t^-(p))|^2 \quad (7)$$

The histogram term penalizes repeated patterns, i.e., repeated repetitions of the same offsets. The synthesis application may build a histogram of a offset field $\mathcal{H}(M_t)$ by counting the number of occurrences of each offset. The histogram also corresponds to the frequency of appearance of each pixel of $\hat{S}$ in $\hat{I}_t$. Given the histogram $\mathcal{H}(M_t)$, the histogram goal term may be written as:

$$g_h = h_s \max(0, \mathcal{H}(M_t)(p) - h_r), \quad (8)$$

where the parameters $h_s$ and $h_r$ are adjustable to control the minimum number of repetitions $h_r$ after which a penalty applies and the penalty's strength $h_s$. To encourage spatial variations and prevent local oscillations, the histogram itself may also be blurred with a Gaussian kernel. Note, the histogram term only considers the distribution of the output offsets without taking into account the statistics of the input frame and input style. If the input frame is especially dark, then the offsets may be biased, in one embodiment, towards dark areas of the input style, and vice versa.

The distance transform term may be used to stylize lines. In one embodiment, the synthesis application may compute the distance transform of the input frame $\mathcal{D}(I_t)$ and the distance transform of the style $\mathcal{D}(S)$. The goal term may attempt to match these distance transforms and be defined as:

$$g_{dt} = |\min(\mathcal{D}(I_t)(p) - \mathcal{D}(S)(M_t(p)), d_{max})|^2 \quad (9)$$

where $d_{max}$ bounds the distance transform, such that regular synthesis is used when p is far enough from any line.

At step 350, the synthesis application generates an initial guess of an offset field for each subsequent frame t using the offset field of frame t−1. For each pixel p, the synthesis application may determine whether the pixel was occluded or visible in the previous frame, as discussed in greater detail below with respect to FIG. 5. If the pixel was occluded, a random offset may be used for that pixel. If, on the other hand, the pixel was visible, the synthesis application may advect the offset of the previous frame by looking up $M_{t-1}(p - V_t^-)$ to determine an estimate of the prior match $p_-$. In particular, the synthesis application may find the closest sample $\tilde{p}$ to $p - V_t^-$ and extrapolate using the orientation at $\tilde{p}$ to find $p_-$.

At step 360, the synthesis application optimizes an offset field of each frame t, beginning from the initial guess of step 350. Similar to step 340, for each pixel p, the synthesis application may select candidate pixels around the initial guess in output style image S, evaluate a goal function at each of the candidate pixels, and update the offset field using a candidate pixel having the best (e.g., highest or lowest) goal function value, if that goal function value improves over that of the initial. This process may then be repeated, with offsets being updated for improvements in goal function value, until converge. At each iteration, the candidate pixels may be selected, and the optimization performed, by any feasible means, such as that used in PatchMatch optimization. As discussed, orientation may also be accounted for.

At step 370, the synthesis application performs a backward sweep. Similar to steps 330-360, the synthesis application may synthesize the last frame to generate an offset field for that last frame, generates an initial guess of an offset field for each subsequent frame t using the offset field of frame t+1, and optimize the offset field of each frame t beginning from the initial guess, until convergence. To take into account the solution of the forward sweep, the synthesis application may randomly merge the last offset field at frame t with the advected result from frame t+1 before performing optimization. Such random merging is well suited to, e.g., PatchMatch optimization, as it effectively makes both the forward and backward solutions available to the propagation of Patch-Match. As a result, for every pixel in the merged offset field, PatchMatch may likely find a neighboring pixel from the forward solution and a neighboring pixel from the backward solution. For occluded pixels, the synthesis application may use only the offsets of the previous forward sweep, rather than a merged offset.

At step 380, the synthesis application up-samples the synthesized result. That is, the latest offset field is up-sampled so that it may be used as a starting point for another optimization iteration at a finer level of detail. At step 390, the synthesis application determines if the original sampling has been optimized, i.e., if the last iteration of optimization was at the original resolution before down-sampling. If such is the case, the method 300 ends thereafter. Otherwise, the method 300 returns to step 330, where the synthesis application uses the offset fields from the previous iteration at the lower-resolution sampling as the initialized offset fields for further optimization.

Although discussed above primarily with respect to input and output stylized images, in one embodiment the example stylized images may be keyframes from the animation sequence itself which have been, e.g., painted by an artist. In another embodiment, partial keyframes may be defined by providing an extra mast as input (or using the alpha channel of the image). The approach discussed above may be adapted to a nonlinear in-betweening technique by adding new temporal terms in the optimization and facilitating transitions between keyframes. In particular, the offset field for any given frame may include pixel coordinates from the two images keyframes between which the given frame lies. When a forward or backward sweep reaches a keyframe, that keyframe may used to replace the current synthesized frame. Doing so ensures that keyframes are perfectly matched, and gives the best starting point for advection to the next frame.

Further, as a preprocessing step, the animation scene from which keyframes are taken may be decomposed into layers that can be painted separately. For each scene element, the synthesis application may extrapolate the image-space velocity fields using a distance transform of the input layer. Doing so permits an artist to apply paint beyond a boundary of an element in the input animation, and the overpainted regions to be rendered sensibly by the extrapolated velocity field. This may be particularly beneficial for CG animations which include perfect boundaries, in contrast to the non-perfect boundaries of many styles. Further, the decomposition into layers not only allows overdraws and partial transparency, but also reduces the ambiguity of the analogy by spatially constraining the search space-colors of different layers are not allowed to mix together.

Further yet, the goal function may include, in lieu of the temporal coherence term $g_{tc}$, an input time-derivative term which enforces that the synthesized animation change in the same way the input animation changes and an output time-derivative term that allows the output to change consistently with spatial variations in style. For visible (i.e., non-occluded) pixels at the previous frame, the input time-derivate term measures the temporal variation of the input images $I_t$ and $I_{t-1}$ compares it with the corresponding spatial variation in the input style S at the offsets $C_t$ and $C_{t-1}$.

$$g^-_{\partial in} = \chi^-(p + \Delta p, t) \quad (10)$$

$$|(I_t(p+\Delta p)) - I_{t-1}(p+\Delta p - V_t^-(p+\Delta p)) - (S(C_t(p,\Delta p) - S(C_{t-1}(p-V_t^-(p),\Delta p))))|^2$$

A similar output time-derivative term $g_{\partial out}^-$ may be defined by replacing $I_t$ and S in $g_{\partial in}^-$ with $\hat{I}_t$ and $\hat{S}$. However, experience has shown that the influence of the output time-derivative term may be limited. Similar terms $g_{\partial in}^+$ and $g_{\partial out}^+$ may be defined for backward sweeps.

In addition, where the example stylized images are keyframes, the random merging scheme discussed above may be biased towards the closest keyframe to any given frame. Doing so enforces smooth convergence during optimization. Given frame t and the indices of the last and next keyframes $t_l \leq t$ and $t_n \geq t$, the synthesis application may randomly choose pixels from the forward pass with probability $$\frac{t_n - t}{t_n - t_l}$$

and from the backward pass with probability $$\frac{t - t_l}{t_n - t_l}.$$

In one embodiment, the histogram goal function term, discussed above, may also be modified to take into account distance to nearby frames.

Where PatchMatch is used, the propagation and random search steps of Patchmatch may also be modified. In one embodiment, the synthesis application may compute correspondences or ribbons between every successive pair of keyframes by either recursively following velocity paths from one keyframe to the next, or directly rendering long range velocities between keyframes. These ribbons allow navigation across keyframes following relevant paths in the input 3D animation. During PatchMatch optimization, the search space may be extended by testing offset candidates that are not only spatial neighbors in the current style (as in the usual PatchMatch algorithm), but also neighbors following the ribbons. Doing so eases and smoothes transitions between keyframes while making efficient and effective the exploration of the most relevant subparts of the search space.

Figure 4:
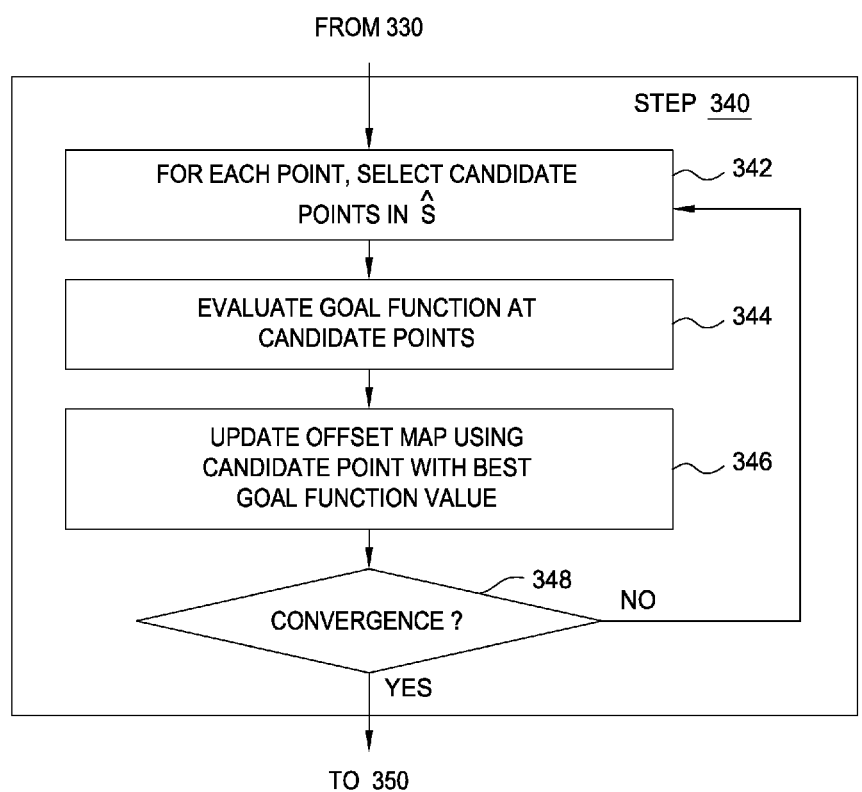
FIG. 4 illustrates one of the steps shown in FIG. 3, according to an embodiment of the invention.

FIG. 4 further illustrates step 340 of method 300, according to an embodiment. At step 342, the synthesis application selects candidate pixels in S for each pixel in frame I. It is generally computationally intractable to consider all pixels in S, as $\hat{S}$ may include, e.g., millions of pixels. Instead, candidate pixels may be chosen using any feasible means, such as that used in PatchMatch or improvements thereto (e.g., search across scales and rotations, or gradient energy terms and poisson blending).

At step 344, the synthesis application evaluates a goal function at each of the candidate pixels. As discussed, the goal function may be constructed as the weighted sum of a number of contributing goal functions, each representing a distinct aim of synthesis. In one embodiment, the contributing goal functions may include an output term, an input term, a spatial coherence term, a temporal coherence term, a histogram term, and a distance transform term, as discussed above with respect to FIG. 3. Where keyframe examples are provided, the goal function may also include an input time-derivative and an output time-derivative.

At step 346, the synthesis application updates an offset field using the candidate pixel with the best goal function value. The best goal function value may be, e.g., the highest or lowest goal function value, depending on the definition of the goal function. The offset field may only be updated if the best goal function value improves over the goal function value of the current offset in the map. That is, the candidate pixel with the best goal function value replaces the current offset only if the goal function value improves as a result.

At step 348, the synthesis application determines whether the optimization has converged. If convergence has occurred, then additional optimization iterations are unlikely to improve the result, and the method 300 continues at step 350. Otherwise, if the optimization has not yet converged, the method 300 returns to step 342, where additional candidate pixels are selected by the synthesis application for evaluation.

Although discussed above with respect to step 340 of FIG. 3, step 360's optimizing of offset maps of each frame may be performed using similar steps, with the optimization beginning from an initial guess based on the advected results for a previous frame.

Figure 5:
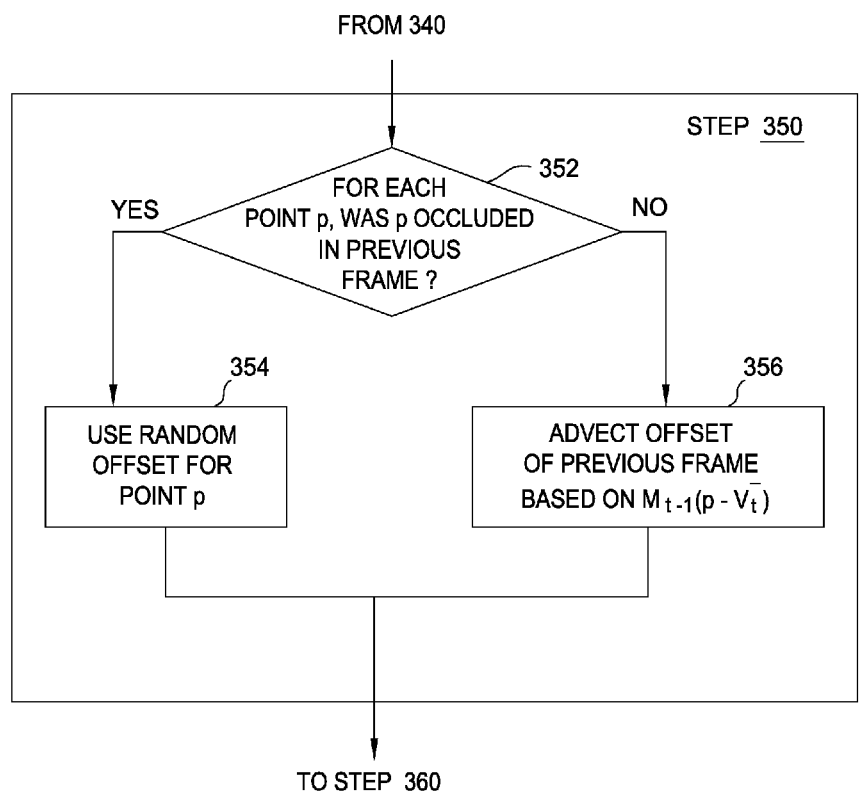
FIG. 5 illustrates another one of the steps shown in FIG. 3, according to an embodiment of the invention.

FIG. 5 further illustrates step 350 of method 300, according to an embodiment. At step 352, the synthesis application determines, for each pixel p, whether pixel p was occluded in the previous frame. In one embodiment, occlusion may be determined based on velocity fields $V_t^+(p)$ and $V_t^-(p)$, where the field $V_t^+(p)$ is a forward finite difference of screen-space velocity and the field $V_t^-(p)$ is a backward finite difference. Here, a pixel visible at p in frame t moves to $p+V_t^+(p)$ in frame t+1. Similarly, a pixel visible at pixel p in frame t came from $p-V_t^-(p)$ in frame t-1.

The function $V_t^+(p)$ gives where p will project in the next frame, while $V_t^-(p)$ gives where p projected from in the previous frame. Together, the functions $V_t^+(p)$ and $V_t^-(p)$ may be used to determine whether pixel p was occluded in the previous frame. In particular, in the absence of occlusion, following the velocity field backward and then forward should return to the starting position, i.e., $(p-V_t^-(p))+V_{t-1}^+(p-V_t^-(p))=p$.

Conversely, where the pixel p is occluded in either frame t or frame t-1, following the velocity field backward and forward should produce a position different than the starting position. Based on these conditions, the synthesis application may use occlusion functions defined as follows:

$$\chi^-(p, t) = \begin{cases} 1 & \text{if} \|V_{t-1}^+(p - V_t^-(p)) - V_t^-(p)\|^2 < \epsilon \\ 0 & \text{otherwise} \end{cases} \quad (11)$$

$$\chi^+(p, t) = \begin{cases} 1 & \text{if} \|V_{t+1}^-(p + V_t^+(p)) - V_t^+(p)\|^2 < \epsilon \\ 0 & \text{otherwise} \end{cases}$$

Here, $\chi^-(p,t)$ is one if p was not occluded at frame t-1, and $\chi^+(p,t)$ is one if p is not occluded at frame t. The velocities being rasterized on the pixel grid, the comparison is made with a given tolerance $\epsilon$.

If pixel p was occluded in the previous frame, then at step 354, the synthesis application generates a random offset for pixel p. If pixel p was not occluded in the previous frame, then the synthesis application advects the offset of the previous frame by looking up $M_{t-1}(p-V_t^-)$ to compute an estimate of a prior match for the pixel $p_-$. In this lookup, the synthesis application may find the closest sample pixel $\tilde{p}$ to $p-V_t^-$ and extrapolate using the orientation at $\tilde{p}$ to find $p_-$. The advected offset may, in turn, be used as the starting point for optimization of the offset field for the current frame, as discussed above.

Advantageously, techniques disclosed herein permit painterly animations having a wide range of styles to be generated. As a result, CG rendered (or other) animations may be converted to animations having visual styles, while achieving temporal coherence necessary for pleasing painterly animation, especially in terms of flatness and motion coherence. Artists may provide desired styles as examples, based on which the stylized animations are then generated. For even greater control over the result, artists may provide stylized keyframes as hard constraints.

While the foregoing is directed to aspects of the present invention, other and further aspects of the invention may be devised without departing from the basic scope thereof, and the scope thereof is determined by the claims that follow.

What is claimed is:

1. A computer-implemented method for stylizing an animation, comprising:
  receiving a first set of buffers including an input animation and a second set of buffers including one or more example stylized images;
  generating, by operation of one or more processors, an offset field for a first frame of the input animation by iterative optimization based on a goal function;
  for each remaining frame of the input animation:
    advecting an offset field for a preceding frame to use as an initial offset field guess for a current frame, and
    iteratively optimizing the initial offset field guess based on the goal function to generate an offset field for the current frame; and
  generating, by operation of the one or more processors, a stylized version of the input animation based on the offset fields.

2. The method of claim 1, wherein the steps of generating the offset field for the first frame, and advecting the offset field and iteratively optimizing the initial offset field guess for each remaining frame, are performed in both forward and reverse temporal directions, and
  wherein, when proceeding in the reverse direction, the offset fields generated when proceeding in the forward direction are randomly merged with the advected offset fields before the iterative optimization.

3. The method of claim 1, wherein advecting the offset field associated with the preceding frame includes:
  determining whether each pixel was visible in the preceding frame;
  and, if the pixel was visible, using an offset associated with the pixel as it appeared in the offset field for the preceding frame as an initial offset guess for the pixel.

4. The method of claim 3, wherein determining whether each pixel was visible in the preceding frame includes following a first velocity field backward to the preceding frame and following a second velocity field forward from the preceding frame to determine whether the respective pixel returns to itself.

5. The method of claim 1, wherein the goal function includes a temporal coherence term which minimizes color variations of frames of the animation along motion paths.

6. The method of claim 1, wherein the goal function includes a histogram term which penalizes repeated patterns in frames of the stylized version of the input animation.

7. The method of claim 1, wherein the goal function includes a distance transform term which enforces matching of distance transforms of input images associated with the one or more stylized images with distance transforms of frames of the input animation.

8. The method of claim 1, wherein the iterative optimizations use parallel coarse-to-fine PatchMatch.

9. The method of claim 1, wherein the example stylized images are keyframes of the input animation which have been painted by a user.

10. The method of claim 9, wherein the goal function includes an input-derivative term which enforces the stylized version of the input animation to change in the same manner that the input animation changes.

11. The method of claim 9, wherein the keyframes are copied into the stylized version of the input animation,
wherein the steps of generating the offset field for the first frame, and advecting the offset field and iteratively optimizing the intial offset field guess for each remaining frame, are performed in both forward and reverse temporal directions,
wherein, when proceeding in the reverse direction, the offset fields generated when proceeding in the forward direction are randomly merged with the advected offset fields, with a bias towards a closest keyframe, and
wherein during iterative optimizations, offset candidates are selected which are neighbors following ribbons between successive pairs of keyframes determined by one of recursively following velocity paths from one keyframe to another or rendering long range velocities between keyframes.

12. The method of claim 9, wherein a scene of the animation is decomposed into separately-paintable layers.

13. A non-transitory computer-readable storage media storing instructions, which when executed by a computer system, perform operations for stylizing an animation, the operations comprising:
receiving a first set of buffers including an input animation and a second set of buffers including one or more example stylized images;
generating an offset field for a first frame of the input animation by iterative optimization based on a goal function;
for each remaining frame of the input animation:
advecting an offset field for a preceding frame to use as an initial offset field guess for a current frame, and
iteratively optimizing the initial offset field guess based on the goal function to generate an offset field for the current frame; and
generating a stylized version of the input animation based on the offset fields.

14. The computer-readable storage media of claim 13, wherein the steps of generating the offset field for the first frame, and advecting the offset field and iteratively optimizing the intial offset field guess for each remaining frame, are performed in both forward and reverse temporal directions, and
wherein, when proceeding in the reverse direction, the offset fields generated when proceeding in the forward direction are randomly merged with the advected offset fields before the iterative optimization.

15. The computer-readable storage media of claim 13, wherein advecting the offset field associated with the preceding frame includes:
determining whether each pixel was visible in the preceding frame;
and, if the pixel was visible, using an offset associated with the pixel as it appeared in the offset field for the preceding frame as an initial offset guess for the pixel.

16. The computer-readable storage media of claim 15, wherein determining whether each pixel was visible in the preceding frame includes following a first velocity field backward to the preceding frame and following a second velocity field forward from the preceding frame to determine whether the respective pixel returns to itself.

17. The computer-readable storage media of claim 13, wherein the goal function includes a temporal coherence term which minimizes color variations of frames of the animation along motion paths.

18. The computer-readable storage media of claim 13, wherein the goal function includes a histogram term which penalizes repeated patterns in frames of the stylized version of the input animation.

19. The computer-readable storage media of claim 13, wherein the goal function includes a distance transform term which enforces matching of distance transforms of input images associated with the one or more stylized images with distance transforms of frames of the input animation.

20. The computer-readable storage media of claim 13, wherein the iterative optimizations use parallel coarse-to-fine PatchMatch.

21. The computer-readable storage media of claim 13, wherein the example stylized images are keyframes of the input animation which have been painted by a user.

22. The computer-readable storage media of claim 21, wherein the goal function includes an input-derivative term which enforces the stylized version of the input animation to change in the same manner that the input animation changes.

23. The computer-readable storage media of claim 21, wherein the keyframes are copied into the stylized version of the input animation,
wherein the steps of generating the offset field for the first frame, and advecting the offset field and iteratively optimizing the initial offset field guess for each remaining frame, are performed in both forward and reverse temporal directions,
wherein, when proceeding in the reverse direction, the offset fields generated when proceeding in the forward direction are randomly merged with the advected offset fields, with a bias towards a closest keyframe, and
wherein during iterative optimizations, offset candidates are selected which are neighbors following ribbons between successive pairs of keyframes determined by one of recursively following velocity paths from one keyframe to another or rendering long range velocities between keyframes.

24. The computer-readable storage media of claim 21, wherein a scene of the animation is decomposed into separately-paintable layers.

25. A system, comprising:
a processor; and
a memory, wherein the memory includes an application program configured to perform operations for stylizing an animation, the operations comprising:
receiving a first set of buffers including an input animation and a second set of buffers including one or more example stylized images, generating an offset field for a first frame of the input animation by iterative optimization based on a goal function, for each remaining frame of the input animation:
  advecting an offset field for a preceding frame to use as an initial offset field guess for a current frame; and
  iteratively optimizing the initial offset field guess based on the goal function to generate an offset field for the current frame, and generating a stylized version of the input animation based on the offset fields.

* * * * *